United States Patent [19]
Anderson et al.

[11] Patent Number: 5,207,124
[45] Date of Patent: May 4, 1993

[54] SHIFT CONTROL MECHANISM

[76] Inventors: Arthur Anderson, 8925 Ortonville Rd., Clarkston, Mich. 48348; Robert L. Heikkila, 3215 Clawson Ave., Royal Oak, Mich. 48073

[21] Appl. No.: 807,819

[22] Filed: Dec. 16, 1991

[51] Int. Cl.⁵ .......................................... B60K 41/04
[52] U.S. Cl. .................................... 74/878; 70/248; 74/538
[58] Field of Search ............... 74/878, 475, 483 R, 74/501.6, 535, 538; 70/254, 257, 248; 192/4 A

[56] References Cited

U.S. PATENT DOCUMENTS

| | | | |
|---|---|---|---|
| 4,304,112 | 12/1981 | Osborn | 74/535 X |
| 4,365,522 | 12/1982 | Kubota et al. | 74/538 X |
| 4,474,085 | 10/1984 | DeVogelaere et al. | 74/538 X |
| 4,565,151 | 1/1986 | Buma | 74/475 X |
| 4,612,820 | 9/1986 | Behrens | 74/475 |
| 5,035,156 | 7/1991 | Roble | 74/878 X |
| 5,079,966 | 1/1992 | Ishizuki et al. | 74/475 X |
| 5,085,096 | 2/1992 | Behrens | 74/475 |

*Primary Examiner*—Rodney H. Bonck
*Attorney, Agent, or Firm*—Edward P. Barthel

[57] ABSTRACT

A floor mounted shift control mechanism for a vehicle wherein adjustment of each of the cables from the transmission and the key cylinder can be made inside the vehicle within the shift control mechanism. The shift control mechanism also includes provisions for locking the shift lever in its Park position when the key cylinder is in its Lock or Accessory positions; and for preventing the ignition key from being removed from the key cylinder unless the shift lever is in its Park position. There are also included provisions for requiring a high force to override the Locked-in Park condition, while operationally subjecting the cable from the key cylinder to reduced loads; and for an assured detent feeling for the driver while shifting through the various shift positions.

18 Claims, 5 Drawing Sheets

SHIFT CONTROL MECHANISM

TECHNICAL FIELD

This invention relates generally to shift control mechanism and, more specifically, to shift control mechanisms with improved interlock means and other improved operational characteristics.

BACKGROUND ART

Heretofore, to eliminate backlash in a gear shift lever assembly, it has been customary to adjust the conduit or sheath which surrounds the usual cable, in order to eliminate any backlash that may be present in the system. One example of a sheath adjusting lash removal device is shown and described in Ruhala U.S. Pat. No. 3,546,962.

Another known adjustable cable assembly, namely, Deck U.S. Pat. No. 4,034,622, provides adjustment of both the cable and sheath. The sheath includes a threaded coupling member threadedly connected to a rotatable bracket. Rotation of the latter serves to move the coupling member and, hence, the cable and sheath. A lock nut retains the adjusted setting of the bracket and coupling member.

Still another known self-adjusting cable control device is disclosed in Pickell U.S. Pat. No. 4,799,400. In this arrangement, when an adjustment needs to occur because of slack, a spring urges a toothed member connected to a cable to move so as to cause frustoconical surfaces to engage to lift toothed collet members out of engagement with the toothed member until the slack in the cable is removed and the teeth re-engage at a new position.

In vehicles having automatic transmissions with gearshift lever assemblies mounted on the vehicle's floor, it is desirable to have a device which is associated with the ignition system of the vehicle so that when the ignition is locked, the gearshift lever is locked in a park position. Relevant art illustrating various types of transmission shifters with park lock devices include the following U.S. Pat. No.: 4,724,722, issued to Beauch et al; U.S. Pat. No. 4,712,397, issued to Niskanen; U.S. Pat. No. 4,671,085, issued to Yamaguchi et al; U.S. Pat. No. 4,474,085, issued to DeVogelaere et al; U.S. Pat. No. 4,304,112, issued to Osborn; U.S. Pat. No. 4,270,624, issued to Jessop; and U.S. Pat. No. 4,235,123, issued to Simancik et al; and in patent application Ser. No. 07/807,818, filed on Dec. 16, 1991, in the names of William L. Behrens and Arthur Anderson.

Also, in vehicles having automatic transmissions with gearshift lever assemblies mounted on the vehicle's floor, it is desirable to have a shift control mechanism which provides the driver with an assured feeling of security while shifting through the various transmission shift positions. Relevant art illustrating various means for providing the driver with a "feel" or sense of reaching each shift position include the following U.S. patents: U.S. Pat. No. 4,612,820, issued to Behrens; U.S. Pat. No. 4,365,522, issued to Kubota et al; and U.S. Pat. No. 3,998,109, issued to O'Brien. The latter two patents include vertically oriented, metal detent plates for providing the driver with an assured detent feeling while shifting.

DISCLOSURE OF THE INVENTION

A general object of the invention is to provide an improved shift control mechanism.

Another object of the invention is to provide a shift control mechanism with an improved interlock system for locking the shift lever in the park position when the key cylinder is in the lock or accessory positions.

A further object of the invention is to provide a shift control mechanism with an improved means for preventing the ignition key from being removed from the key cylinder unless the shift lever is in the park position.

Still another object of the invention is to provide a floor-mounted shift control mechanism wherein adjustment to each of the transmission and key cylinder cables can be accomplished in the shift control mechanism from within the vehicle.

A still further object of the invention is to provide a shift control mechanism including means for assuring a large force requirement for overriding the park condition, while subjecting the cable from the key cylinder to reduced loads.

Still another object of the invention is to provide a shift control mechanism which is formed of plastic in a sturdy box shape.

A still further object of the invention is to provide improved means for giving the driver an assured detent feeling while shifting through the park, reverse, neutral, and three forward positions.

These and other objects and advantages will become more apparent when reference is made to the following drawings and the related description.

BEST MODE OF CARRYING OUT THE INVENTION

Figures 1, 1A:
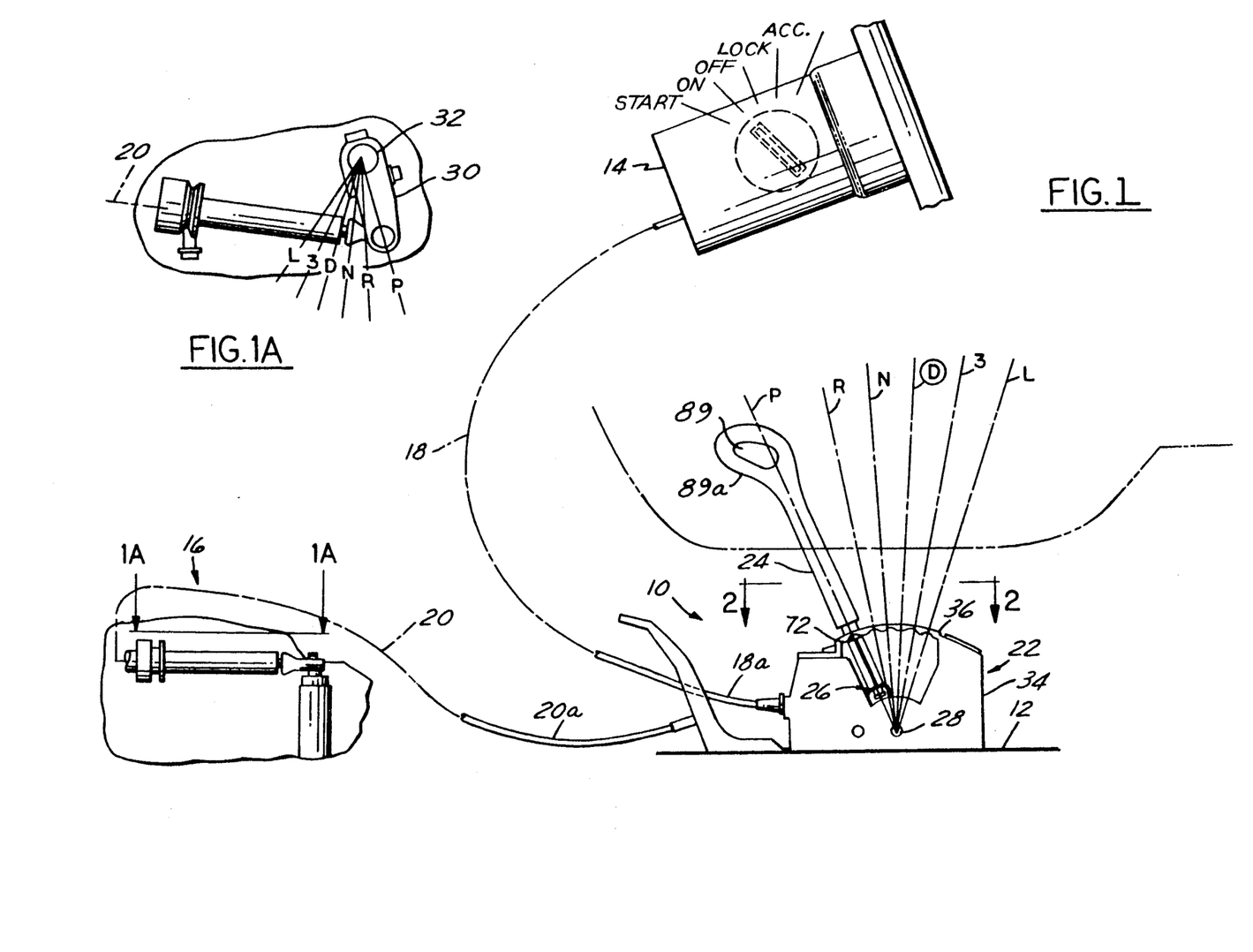
FIG. 1 is a schematic representation of a floor-mounted shift control mechanism operatively connected to a transmission and an ignition tumbler via cables.
FIG. 1A is a top view of portion of the FIG. 1 structure, taken along the plane of the line 1A—1A, and looking in the direction of the arrows.

Referring now to the drawings in greater detail, FIG. 1 illustrates a shift control mechanism 10 mounted on a vehicle floor 12, and operatively connected to each of a key cylinder 14 and a transmission 16 via cables 18 and 20, respectively, within respective sheaves 18a and 20a. As shown, the shift control mechanism 10 includes a housing 22 and a shift lever 24 extending upwardly from a bracket 26 pivotally mounted on a pivot pin 28 therein. The lever 24 is shiftable through Park (P), Reverse (R), Neutral (N), Drive (D), Third (T), and Low (L) settings, as will be explained.

As shown in FIG. 1A, the cable 20 is connected to the distal end of a lever arm 30, which is mounted at the other end thereof on a shaft 32 (FIG. 1) extending into the transmission 16. The shaft 32 moves through the P, R, N, D, T, and L settings, in response to corresponding movements of the shift lever 24.

As also shown in FIG. 1, the key cylinder 14 is actuated via a key not shown) through the positions of Start, On, Off, Lock, and Accessory.

Figure 2:
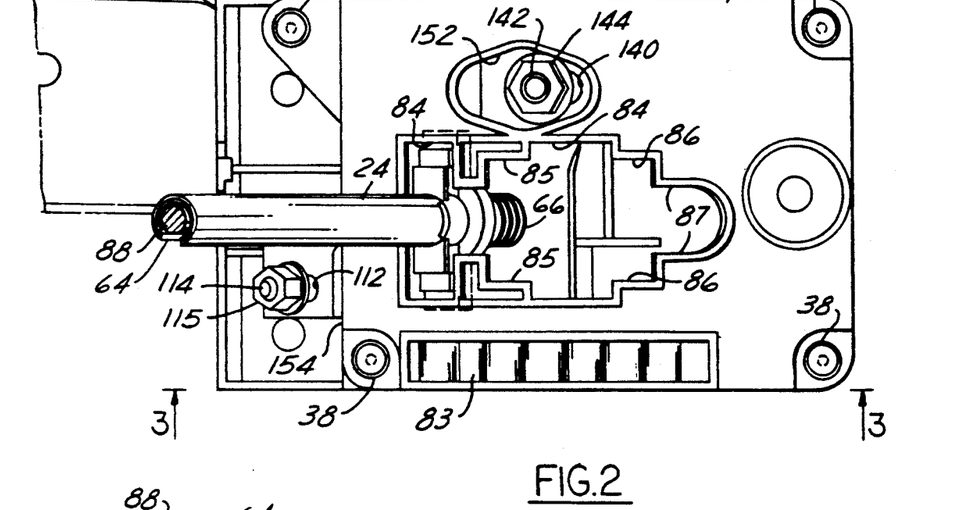
FIG. 2 is an enlarged top view of a portion of the FIG. 1 structure, taken along the plane of the line 2—2, and looking in the direction of the arrows.
Figure 3:
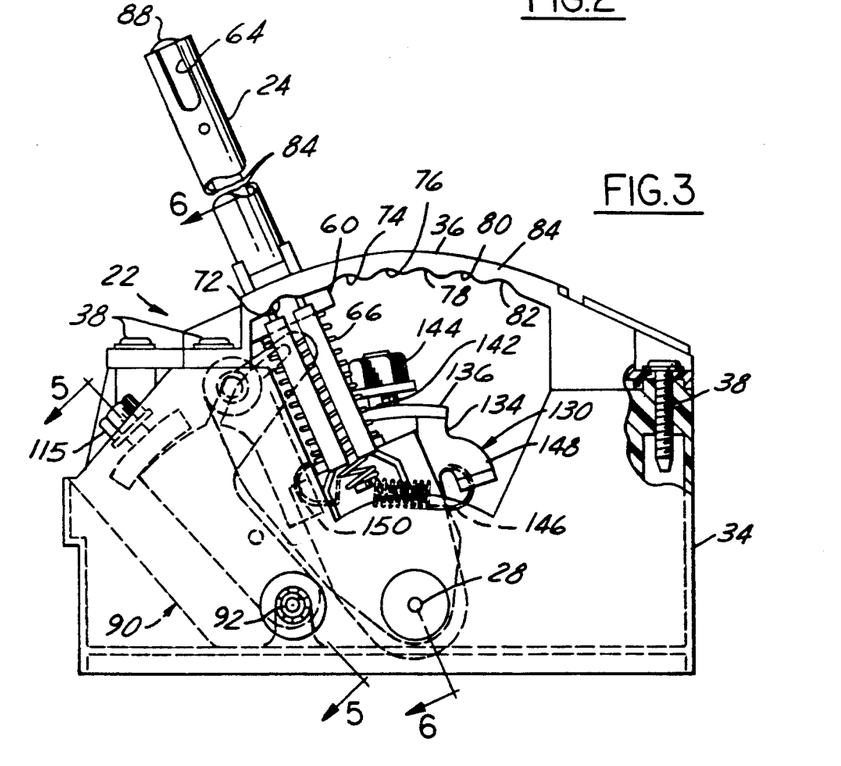
FIG. 3 is a side elevational view taken along the plane of the line 3—3 of FIG. 2, and looking in the direction of the arrows.

As shown in FIGS. 2 and 3, the housing 22 includes a four-side and bottom portion 34 and an arcuate-shaped cover portion 36 secured to the top edge of the four sides by screws 38.

Figure 6:
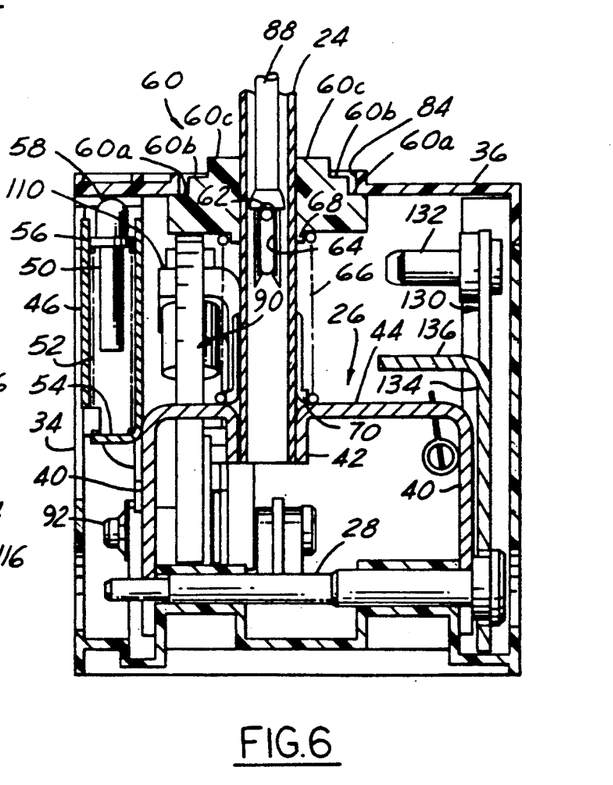

Referring now to FIG. 6, the bracket 26 is seen to be an inverted U-shaped member connected adjacent the end of each downwardly extending leg 40 thereof to the pivot pin 28, with the shift lever 24 secured in a central flanged opening 42 formed in the horizontal portion 44 of the bracket 26.

A tubular member 46 with a bottom seat 54 is secured to the left end (as seen in FIG. 6) of the vertical portion 40 of the bracket 26 by any suitable means, such as welding.

Alternatively, the structure comprising the U-shaped bracket 26, including the legs 40, the central flanged opening 42 and the horizontal portion 44, and the tubular member 46 including its bottom seat 54, may be formed as one integral unit by molding. Such a unit is shown in FIGS. 10-13 to include an inverted substantially U-shaped bracket 26', including legs 40' and 41, a central flanged opening 42' extending both below and above a horizontal portion 44', and a tubular member 46' integrally molded at the juncture of the leg 40' and the horizontal portion 44'. A pin 54' extends across the lower end of the tubular member 46' A support portion 48 is integrally formed between the central flanged opening 42' and the leg 41. A spacer portion 138' (FIGS. 12 and 13) is integrally formed adjacent the end portion of the horizontal portion 44'. A threaded stud 142' is mounted through an opening 143' formed in the spacer portion 138' for a purpose to be described.

A detent member 50 is slidably mounted in the tubular member 46 or 46', urged upwardly therefrom by a coil spring 52 mounted between the bottom seat 54 (FIG. 6) or the pin 54' (FIG. 11) of the tubular member 46 or 46' and a flange 56 formed around the detent member 50. The extended end 58 of the detent member 50 is rounded. A stepped member 60, including right and left steps 60a, 60b and 60c, is slidably mounted around the shift lever 24 by means of a pin 62 extended through an elongated opening 64 formed across the shift lever. A coil spring 66 is mounted around the shift lever 24 between a seat 68 on the bottom surface of the stepped member 60 and a seat 70 on the top surface of the horizontal portion 44 of the bracket 26.

As shown in FIG. 1 and 3, a series of six rounded indentions 72, 74, 76, 78, 80 and 82 are formed in the inner surface of an edge portion 83 (FIG. 2) of the arcuate-shaped cover portion 36, adapted to being respectively engaged by the rounded end 58, for the respective P, R, N D, 3, and L shift settings.

As shown in FIG. 6, the right and left steps 60a abut against the inner surface of the cover portion 36, while the steps 60b and 60c extend upwardly through an opening 84. As may be noted in FIG. 2, the right and left steps 60b are adapted to abut against the inner surfaces of oppositely disposed sets of ribs 85 and 86 formed in the opening 84, with the coil spring 66 slightly compressed. As may also be noted in FIG. 2, the step 60c would abut against the inner surface of the further pair of ribs 87 formed in the opening 84, with the coil spring 66 slightly further compressed.

The abutment of step 60a corresponds to the P position of the rounded end 58 in the indentation 72. The abutment of step 60b to the R position in indentation 74. The abutment of step 60a to the N and D positions in the respective indentations 76 and 78. The abutment of step 60b to the 3 position in the indentation 80. The abutment of step 60c to the L position in the indentation 82. Depression of the stepped member 60 is caused by the downward manual depression of a shift rod 88 (FIGS. 2 and 3) slidably mounted in the shift lever 24, and abutted against the pin 62 (FIG. 6), to push the latter downwardly in the elongated opening 64. This occurs through the actuation of the push button 89 (FIG. 1) extending from the palm abutting knob 89a surrounding the shift lever 24 and operatively connected through suitable linkage members therein to urge the shift rod 88 downwardly against the force of the spring 66, as shown and described in application, Ser. No. 07/807,818, filed on Dec. 16, 1991, in the names of the present inventors.

Figure 4:
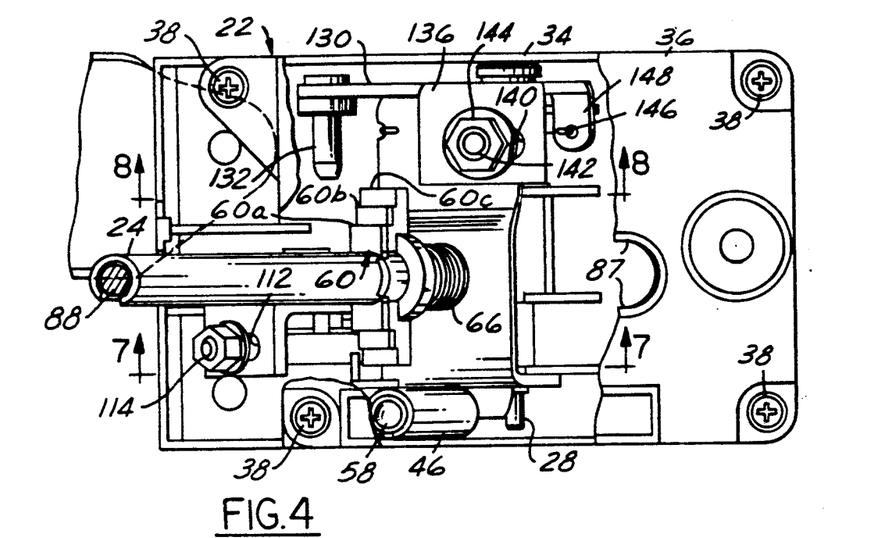
FIG. 4 is a view of the FIG. 2 structure, with portions thereof broken away.
Figure 5:
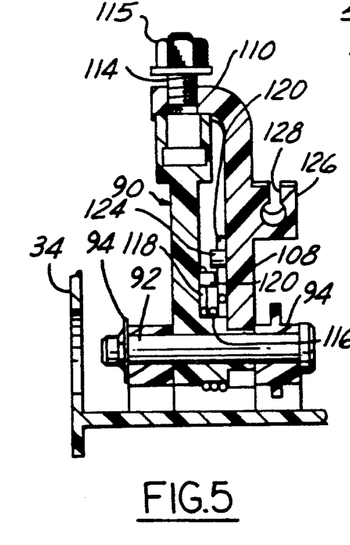
FIG. 5 and 6 are cross-sectional views taken along the planes of the lines 5—5 and 6—6, respectively, of FIG. 3, and looking in the directions of the arrows.
Figure 7:
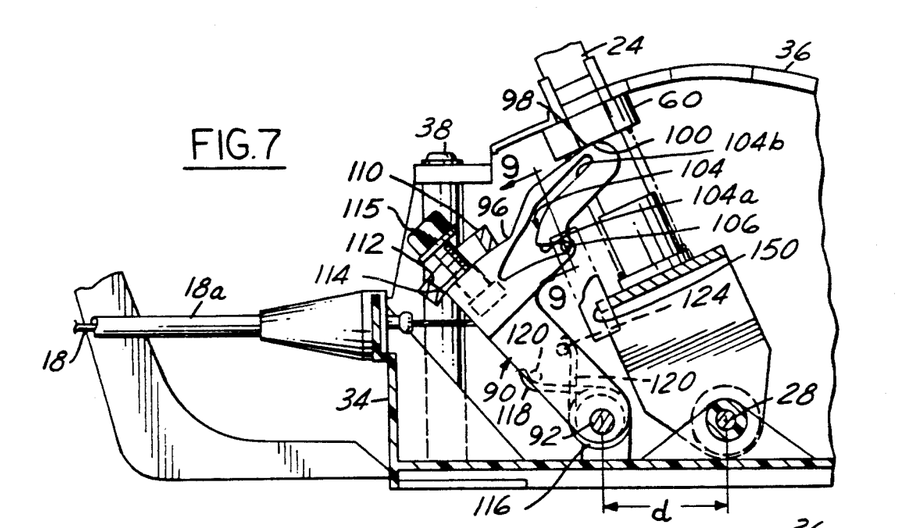
FIGS. 7 and 8 are cross-sectional views taken along the planes of the lines 7—7 and 8—8, respectively, of FIG. 4, and looking in the directions of the arrows.

As shown in FIGS. 4 and 5, and in phantom in FIG. 3, a lever 90 is pivotally mounted on a pivot pin 92 mounted between mounting brackets 94 formed on the bottom portion 34 of the housing 22. The pivot pin 92 and the pivot pin 28 center lines are spaced a predetermined distance d apart, as shown in FIG. 7, for a purpose to be described later. As also shown in FIG. 7, a finger 96 is formed to extend toward and past the shift lever 24, with a cam surface 98 formed on the upper edge of the finger in sliding engagement with one side 100 of the bottom surface of the stepped member 60. A slot 104 having an arcuate section 104a and a slight curve-to-straight section 104b, is formed adjacent the distal end of the finger 102. A pin 106 is secured to the adjacent leg 40 and extends through the slot 104.

An adjustment feature for the cable 18 from the key cylinder 14 is provided by a second lever 108 (FIG. 5) also pivotally mounted on the pivot pin 92 spaced apart from the lever 90. A bent upper end 110 is formed on the second lever 108, extending across the upper edge of the lever 90. A slot 112 (FIG. 4) is formed to extend fore-and-aft with respect to of the housing 22. A threaded stud 114 is secured in the top edge of the lever 90 and extends upwardly through the slot 112. A flanged nut 115 is threadedly mounted on the stud 114, adapted to being tightened down onto the bent end 110 once the relative angular relationship is established between the levers 90 and 108 to adjust the proper operating length of the cable 18 from the key cylinder 14. A torsion spring 116 is mounted intermediate the levers 90 and 108 with the opposite ends 118 and 120 (FIG. 7) thereof abutting against respective short pins 122 and 124 formed on the adjacent side surfaces (FIG. 5) of the levers 90 and 108. The spring 116 urges the lever 108 and its bent end 110 toward the shift lever 24 with respect to a stationary lever 90. The cable 18 is secured to a connector 126 formed on the inner side of the lever 108, with suitable slot and opening means 128 formed in the connector for connecting the end of the cable 18 thereto.

More specifically, with the nut 115 loosened, the lever 108 reaches an equilibrium or "adjusted" position with respect to the force of the torsion spring 116 and the length of the ignition interlock cable 18, eliminating free play and length variance from the system. The nut 115 is then tightened against the bent end 110 of the second lever 108, to thereby interlock the levers 90 and 108 such that they thereafter move as a unit in response to sliding action between the stepped member 60 and the cam surface 98.

Figure 8:
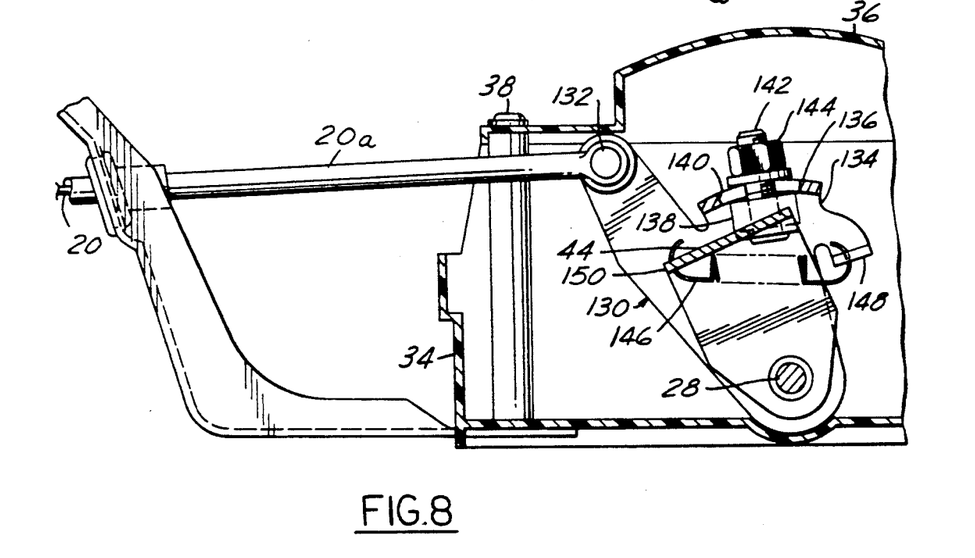
Figure 9:
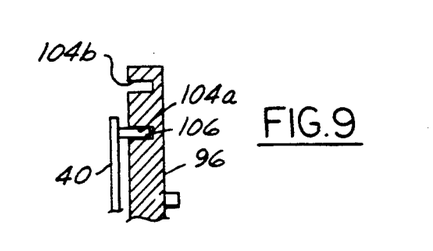
FIG. 9 is a fragmentary cross-sectional view taken along the plane of the line 9—9 of FIG. 7, and looking in the direction of the arrows.
Figure 10:
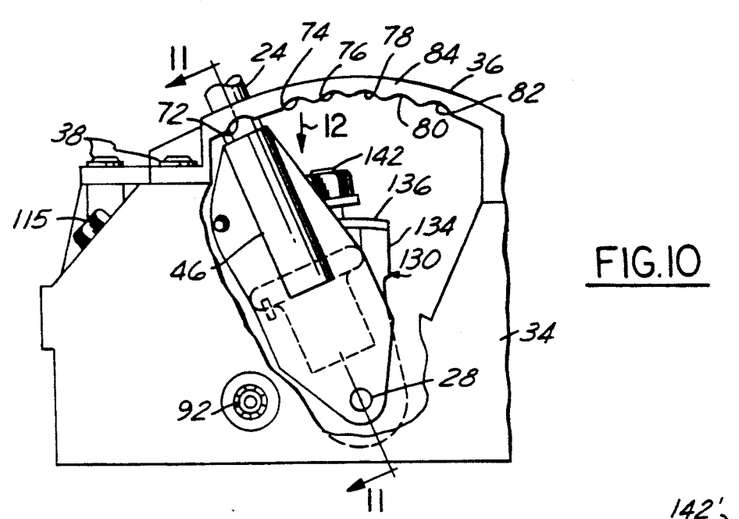
FIG. 10 is a fragmentary side elevational view, in partial cross-section, similar to FIG. 3, showing an alternate embodiment of the invention.
Figure 11:
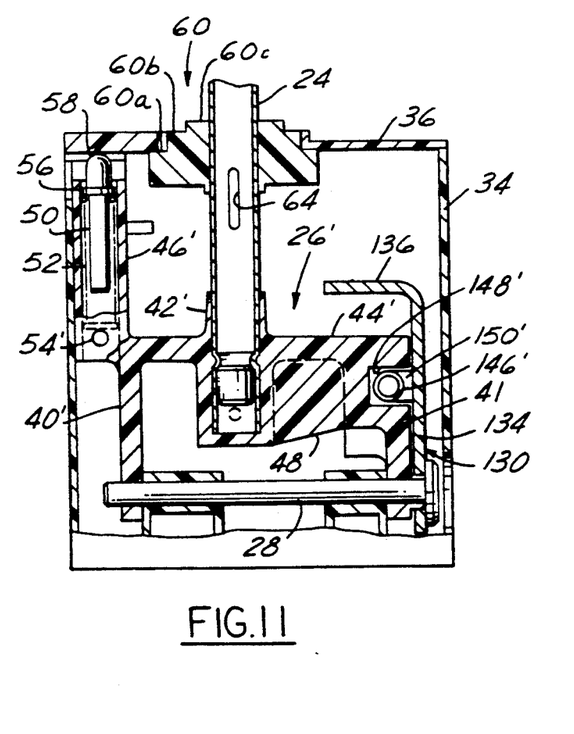
FIG. 11 is a cross-sectional view taken along the plane of the line 11—11 of FIG. 10, and looking in the direction of the arrows.
Figure 12:
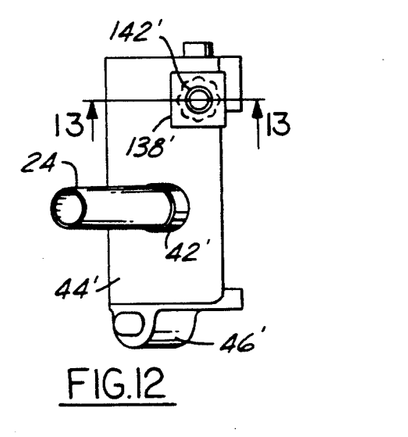
FIG. 12 is a perspective view of a portion of the FIG. 10 structure.
Figure 13:
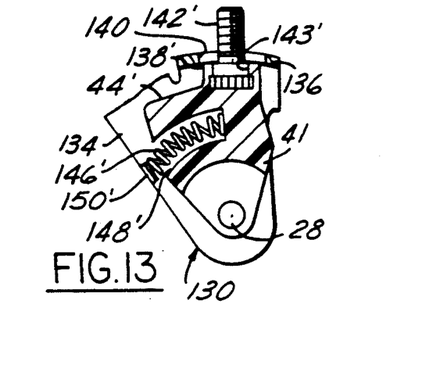
FIG. 13 is a cross-sectional view taken along the plane of the line 13—13 of FIG. 12, and looking in the direction of the arrows.

Referring now to FIGS. 6 and 8, a lever 130 is pivotally mounted around the pivot pin 28. A cable mounting pin 132 is formed on the upper end of the lever 130 for connecting thereto the cable 20 extending from the transmission 16.

An adjustment feature for the cable 20 is provided by a wide central portion 134 of the lever 130, terminating in a bent upper end 136 extending inwardly across a spacer 138 (FIG. 8) mounted between the bent end and an edge portion of the horizontal portion 44 of the bracket 26. In the alternate embodiment of FIGS. 10-13, the spacer portion 138' is formed as an integral part of the horizontal portion 44'. A fore-and-aft oriented slot 140 (FIG. 4) is formed in the bent end 136 A threaded stud 142 extends upwardly from the spacer 138 (FIG. 8) or from the spacer portion 138' (FIG. 13) through the slot 140. A flanged nut 144 is threadedly mounted on the stud 142, adapted to being tightened down onto the bent end 136 once the relative angular relationship is established between the lever 130 and the adjacent fixed bracket 26 to adjust the proper operating length of the cable 20 from the transmission 16 A spring 146 (FIG. 8) is secured at its opposite ends to a flange 148 formed on an edge of the wide central portion 134 away from the lever 130, and to an opposite or forward edge 150 of the horizontal portion 44 of the bracket 26. Alternately, a spring 146' (FIGS. 11 and 13) is mounted between a cavity 148' formed in the leg 41 and an ear 150' formed on the edge of the lever 130. For the former, the spring 146 is an extension spring, and for the latter, the spring 146' is a compression spring. The spring 146 or 146' urges the lever 130 forward, i.e., toward the Park end of the housing 22. More specifically, with the nut 144 loosened, the lever 130 reaches its equilibrium or adjusted position with respect to the force of the spring 146 or 146' and the length of the shift cable 20, assuring that no backlash exists in the system. The nut 144 is then tightened against the bent end 136 of the portion 134 of the lever 130, to thereby interlock the lever 130 and the fixed bracket 26.

It should be noted that, contrary to conventional prior cable adjusters, the split lever adjustments for each of the cables 18 and 20 can be made inside the vehicle at the floor-mounted shift control mechanism 10. As shown in FIG. 2, an opening 152 in the housing cover 36 provides access to the adjustment nut 144, and access to the adjustment nut 115 is just beyond the front edge 154 of the housing cover 36.

Once the cable 18 is adjusted, so long as the ignition key (not shown) is either removed or retains the key cylinder in either the Accessory or Lock positions, the interlock system is in effect, i.e., the cam surface 98 of the finger 96 of the lever 90 is retained against the bottom surface of the stepped member 60, thereby preventing the shift rod 88 from being depressed downwardly by depression of the push button 89 by the operator.

By virtue of the predetermined distance d between the pivot rod 28 and pivot pin 92, the manual force that would be required to override the interlocked Park position can be controlled. Since FIG. 7 is approximately a full size view, the distance d shown establishes a sufficiently high force requirement to override the locked position, as well as a reduced load on the cable 18, as compared to what the latter load would be if the axis of the pivot pin 92 were located a distance greater than d from the axis of the pivot pin 28.

Once the ignition key moves the key cylinder 14 out of the Accessory or Lock positions, the shift control mechanism 10 is free to actuate the transmission.

Referring now to FIG. 7, the relationship between the pin 106 and the slot 104 is such that, so long as the shift lever 24 is in any position except Park, the lever 90 and, hence, the cable 18 cannot be moved. In other words, since the slot 104 consists of an arcuate section 104a, and a longer slight curve-to-straight section 104b, in any position except Park, the pin 106 becomes bound-up in the slight curve-to-straight section 104b and the lever 90 cannot be moved. This effects the blocking of a key cylinder slider (not shown) in the steering column, and prevents the rotation of the key cylinder 14 to the Lock position. Once the shift lever 24 is moved into the Park position, the pin 106 is now in the arcuate section 104a, as shown in FIG. 7, wherein the lever 90 is able to be moved such that the pin 106 is able to traverse the length of the arcuate section and, hence, the cable 18 is movable such that the key cylinder 14 is movable into the Lock.

INDUSTRIAL APPLICABILITY

It should be apparent that the inventive automotive gear shift lever assembly provides an efficient floor-mounted apparatus for serving as a link in the shift cable connection between each of the transmission and the key cylinder, and the shift lever for adjusting the shift cables while ensuring that no backlash will occur in the system, and that such adjustment is accomplished within the shift lever assembly inside the vehicle.

It should also be apparent that the invention provides an efficient arrangement wherein the cable from the key cylinder is subjected to reduced loads, the force required to override the Park condition is able to be selectively large (approximately 35 lbs.), the ignition key cannot be removed from the key cylinder unless the shift lever is in the Park position, and the shift lever is locked in the Park position when the key cylinder is in the Lock or Accessory positions.

It should be further apparent that the invention provides a sturdy box structure, providing an overall rigidity and stiffness, and allowing for the use of plastic materials, and serving to provide an assured detent feeling for the driver while shifting through the various shift positions.

While but two embodiments have been shown and described, other modifications thereof are possible within the scope of the following claims.

The embodiments of the invention in which an exclusive property or privilege is claimed are defined as follows:

1. For use with a transmission and an ignition key cylinder having lock and accessory positions, and said transmission and said ignition key cylinder each having a cable extending therefrom, shift control mechanism comprising a housing having a box-like base and a cover mounted thereon, an opening formed in the cover, a shift lever pivotally mounted in the base and extending upwardly through the opening and adapted to be pivoted through park, reverse, neutral and forward shift positions therein, a spring-loaded member slidably mounted around said shift lever adapted to be manually moved through said shift positions within said opening, a plurality of indentations formed on the inner surface of the cover corresponding to said shift positions, a spring-loaded detent member movable with said shift lever from selective cooperation with said plurality of indentations for assuring definite selections of said shift positions, and interlock means operatively connected to the spring-loaded member and to the key cylinder via the cable extending therefrom for locking the shift lever int he park position when the key cylinder is in its lock or accessory position, wherein said interlock means and said shift lever are pivotally mounted a predetermined distance apart for attaining a mechanical advantage for immunizing cable loads and increasing the force that would be required to override the park condition.

2. The shift control mechanism described in claim 1, and adjustment means associated with said interlock means for adjusting the length of the cable to said key cylinder.

3. The shift control mechanism described in claim 2, and an inverted U-shaped bracket pivotally mounted in said base for mounting said shift lever and said spring-loaded detent member thereon.

4. The shift control mechanism described in claim 3, wherein said interlock means includes an interlock lever pivotally mounted in said base adjacent said inverted U-shaped bracket and operatively connected to the cable from the key cylinder, and an arm formed on said interlock lever and having a cam surface thereon for abutting against a bottom surface of said spring-loaded member around said shift lever in said park position.

5. The shift control mechanism described in claim 4, wherein said adjustment means includes a second lever adjacent said interlock lever, mounting means formed on said second lever for connecting the cable from said key cylinder thereto, spring means operatively connected between said levers, a bent end formed at the top of said second lever and extending across the top of said interlock lever, a slot formed in said bent end, a threaded stud formed on the top of said interlock lever and extending through said slot, and a nut threadedly mounted on the threaded stud adapted to being manually tightened against said bent end once the equilibrium point is reached with respect to the force of said spring means and the length of said cable, thereby eliminating free play and length variance from the system.

6. The shift control mechanism described in claim 5, wherein said spring means is a torsion spring.

7. The shift control mechanism described in claim 1, and means operatively connected between said interlock means and said shift lever for preventing removal of an ignition key from said key cylinder unless said shift lever is in the park position.

8. The shift control mechanism described in claim 7, wherein said means for preventing removal of the ignition key includes an arm formed on said interlock means, a slot having arcuate and slight curve-to-straight sections in series formed in said arm, an inverted U-shaped bracket pivotally mounted in said base, and a pin formed on said inverted U-shaped bracket and extending through said slot such that said pin is in said arcuate section only when said shift lever is in part position, and in said slight curve-to-straight section for all shift positions other than park to thereby assume a binding mode with the arcuate section and, thereby, prevent any movement of said key cylinder through said cable from said interlock means until said shift lever is returned to its park position and said pin to said straight section.

9. The shift control mechanism described in claim 1, and adjustment means operatively connected to said shift lever for adjusting the length of the cable to said transmission.

10. The shift control mechanism described in claims 9, wherein said adjustment means includes a lever pivotally mounted on said base, a mounting pin formed on said lever for connecting the cable from the transmission thereto, an inverted u-shaped bracket pivotally mounted in said base, an extended portion formed on said lever along side said inverted U-shaped bracket, a bent end formed on said extended portion extending across said bracket, a lost formed in said bent end, a threaded stud fixedly secured on said bracket and extending through said slot, spring means operatively connected between said extended portion and said bracket, a nut threadedly mounted on he threaded stud adapted to being manually tightened against said bent end once the equilibrium point is reached with respect to the force of said spring means and the length of said cable, thereby eliminating backlash from the system.

11. The shift control mechanism described in claim 10, wherein said spring means is an extension spring.

12. The shift control mechanisms described in claim 10, wherein said spring means is a compression spring.

13. The shift control mechanism described in claim 1, wherein said opening has variable widths therein in alignment with said respective indentations, and said spring-loaded member around said shift lever is a stepped member adapted to cooperate with said variable widths.

14. The shift control mechanism described in claim 1, wherein said box-like base and said cover are formed of plastic.

15. The shift control mechanisms described in claim 1, wherein said cover is arcuate-shaped.

16. The shift control mechanisms described in claim 15, wherein said plurality of indentations formed in said arcuate-shaped cover are laterally oriented, a bracket pivotally mounted in said base, and a spring loaded plunger mounted on said bracket for moving in and out of said indentations while said shift lever is being shifted through the various shift positions to provide the operator with an assured detent feeling.

17. For use with a transmission and an ignition key cylinder having lock and accessory positions, and said transmission and said ignition key cylinder each having a cable extending therefrom, shift control mechanism comprising a housing having a box-like base and a cover mounted thereon, an opening formed in the cover, a shift lever pivotally mounted in the base and extending upwardly through the opening and adapted to be pivoted through park, reverse, neutral and forward shift position therein, a spring-loaded member slidably mounted around said shift lever adapted to be manually moved through said shift positions within said opening, interlock means operatively connected to the spring-loaded member and to the key cylinder via the cable extending therefrom for locking the shift lever in the park position when the key cylinder is in its lock or accessory positions, wherein said interlock means includes an interlock lever pivotally mounted in said base adjacent said pivotally mounted shift lever and operatively connected to the cable from the key cylinder, and wherein said interlock lever and said shift lever are pivotally mounted a predetermined distance apart for attaining a mechanical advantage for minimizing cable loads and increasing the force that would be required to override the park condition.

18. The shift control mechanisms described in claim 17, and an arm formed on said interlock lever and having a cam surface thereon for abutting against a bottom surface of said spring-loaded member around said shift lever in said park position.

* * * * *

UNITED STATES PATENT AND TRADEMARK OFFICE
CERTIFICATE OF CORRECTION

PATENT NO. : 5,207,124
DATED : May 4, 1993
INVENTOR(S) : Anderson, et. al.

It is certified that error appears in the above-indentified patent and that said Letters Patent is hereby corrected as shown below:

Title page, item [73], Assignee: should read --Chrysler Corporation--.

Signed and Sealed this

First Day of November, 1994

*Attest:*

*Attesting Officer*

BRUCE LEHMAN

*Commissioner of Patents and Trademarks*